United States Patent
Sinclair

(10) Patent No.: US 9,340,095 B2
(45) Date of Patent: May 17, 2016

(54) SUN SHIELD DEVICE FOR WINDSHIELD

(71) Applicant: Ford Global Technologies, LLC, Dearborn, MI (US)

(72) Inventor: Joel A. Sinclair, Orlando, FL (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/316,119

(22) Filed: Jun. 26, 2014

(65) Prior Publication Data
US 2015/0061324 A1 Mar. 5, 2015

Related U.S. Application Data

(60) Provisional application No. 61/870,255, filed on Aug. 27, 2013.

(51) Int. Cl.
*B60J 3/00* (2006.01)
*B60J 1/20* (2006.01)
*B60R 21/08* (2006.01)
*B60R 21/02* (2006.01)

(52) U.S. Cl.
CPC .............. *B60J 1/2025* (2013.01); *B60J 1/2016* (2013.01); *B60J 1/2044* (2013.01); *B60J 1/2047* (2013.01); *B60J 1/2052* (2013.01); *B60J 1/2063* (2013.01); *B60J 1/2077* (2013.01); *B60J 1/2094* (2013.01); *B60R 21/08* (2013.01); *B60R 2021/0273* (2013.01)

(58) Field of Classification Search
CPC ...... B60J 1/2038; B60J 1/2044; B60J 1/2016; B60J 1/2047; B60J 1/2052; B60J 1/2063; B60J 1/2077; B60J 1/2094; B60R 21/08; B60R 2021/0273

USPC ................... 296/97.8, 70, 191, 193.06, 146.7
See application file for complete search history.

(56) References Cited

U.S. PATENT DOCUMENTS

| | | | |
|---|---|---|---|
| 4,929,014 A | 5/1990 | Clark et al. | |
| 5,098,149 A | 3/1992 | Lee | |
| 5,653,278 A | 8/1997 | Cheng | |
| 6,086,133 A * | 7/2000 | Alonso | 296/97.8 |
| 6,227,601 B1 * | 5/2001 | LaFrance | 296/97.4 |
| 6,407,365 B1 | 6/2002 | De Prete, III | |
| 6,776,211 B2 | 8/2004 | Schlecht et al. | |
| 7,140,662 B1 | 11/2006 | Wilkinson et al. | |
| 7,216,917 B2 | 5/2007 | Tadakamalla | |
| 7,252,321 B2 | 8/2007 | Lee | |
| 7,475,935 B2 * | 1/2009 | Ercolano | 296/146.7 |
| 7,493,933 B2 * | 2/2009 | Li | 160/370.22 |
| 7,673,925 B2 * | 3/2010 | Lin | 296/97.4 |
| 7,934,533 B2 * | 5/2011 | Walter et al. | 160/370.22 |
| 8,281,847 B2 * | 10/2012 | Uehara et al. | 160/370.22 |
| 8,393,380 B2 * | 3/2013 | Uehara et al. | 160/370.22 |
| 8,616,610 B1 * | 12/2013 | Martinez | 296/97.7 |
| 8,905,116 B2 * | 12/2014 | Weinbrenner | 160/370.22 |
| 2006/0082192 A1 | 4/2006 | Dubay et al. | |

(Continued)

*Primary Examiner* — Pinel Romain
(74) *Attorney, Agent, or Firm* — Vichit Chea; Price Heneveld LLP

(57) ABSTRACT

A sun screen for a vehicle having a windshield, an A-pillar and a dashboard includes a spool rotatably coupled with the dashboard and a guide moveably coupled with the A-pillar. The sun screen further includes a unitary, flexible substrate spanning a width of the windshield and having a trailing end coupled with the spool and a leading end coupled with the guide such that the substrate is selectively extendable over the windshield and retractable on the spool.

17 Claims, 11 Drawing Sheets

(56) References Cited

U.S. PATENT DOCUMENTS

2009/0145559 A1* 6/2009 Glasl ............... B60J 1/2041
 160/273.1

2010/0013262 A1* 1/2010 Shu ................. B60J 1/2038
 296/97.8

* cited by examiner

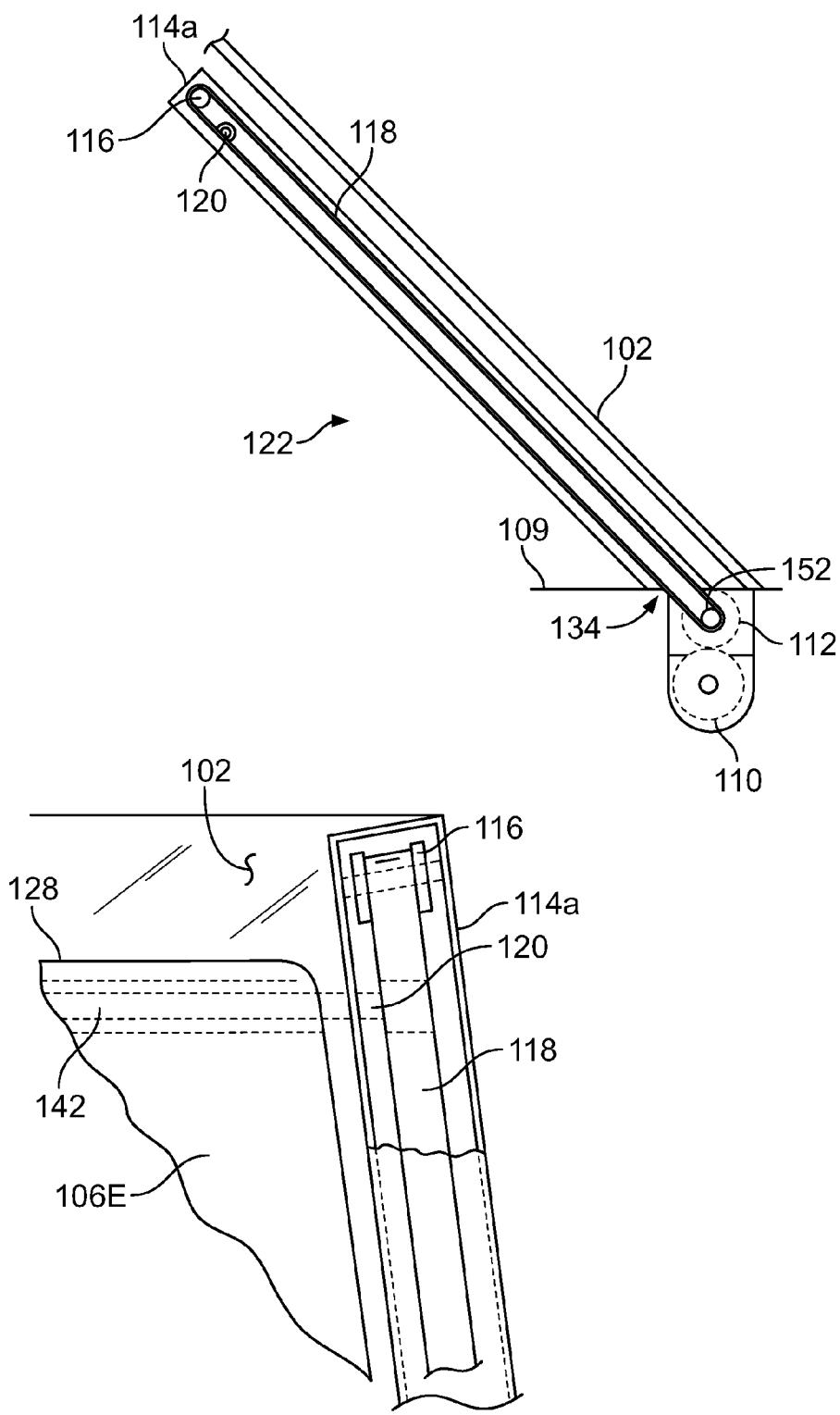

SUN SHIELD DEVICE FOR WINDSHIELD

CROSS-REFERENCE TO RELATED APPLICATION

This application claims the benefit of U.S. Provisional Patent Application No. 61/870,255, filed on Aug. 27, 2013, entitled "SUN SHIELD DEVICE FOR A WINDSHIELD," which is hereby incorporated by reference in its entirety.

FIELD OF THE INVENTION

The present invention generally relates to a sun shield device for a windshield. Specifically, the present sun shield is extendable from a vehicle dashboard to cover the windshield with a unitary substrate.

BACKGROUND OF THE INVENTION

Automobiles generally have windshields that allow the driver to see while driving. The windshields are designed to allow the greatest possible visibility. This characteristic also allows for the most sunlight to penetrate the interior of the automobile. Accordingly, the interior of an automobile is susceptible to extremely high temperatures when the automobile is stationary and parked in the sunlight.

Various types of sun shades have been used in the past that generally include placing a folded up rectangular-shaped piece of cardboard (or similar material) inside the automobile against the windshield to block the sunlight. While such means may be effective in blocking the sunlight, such devices are inconvenient and often slip down allowing the sunlight to enter and provide no protection.

Accordingly, there is a desire in the art for a sun shield that is convenient to deploy and is effective in blocking the sunlight.

SUMMARY OF THE INVENTION

According to one aspect of the present invention, a sun screen for a vehicle having a windshield, an A-pillar and a dashboard includes a spool rotatably coupled with the dashboard and a guide moveably coupled with the A-pillar. The sun screen further includes a unitary, flexible substrate spanning a width of the windshield and having a trailing end coupled with the spool and a leading end coupled with the guide such that the substrate is selectively extendable over the windshield and retractable on the spool.

According to another aspect of the present invention, an automobile includes a window, a body member bounding a lateral edge of the window, and a panel extending from the body member adjacent a lower edge of the window. The automobile further includes a sun screen having a spool rotatably coupled with the panel, a guide moveably coupled with the body member, and a flexible substrate having a trailing end coupled with the spool and a leading end coupled with the guide such that the substrate is selectively extendable over the window and retractable on the spool.

According to another aspect of the present invention, a vehicle safety system for a vehicle having a windshield and a dashboard includes a screen having a flexible substrate spanning a width of the windshield and being selectively positionable in an extended position over the windshield and a retracted position within the dashboard. The safety system further includes a drive mechanism having a propellant unit operatively coupled with the substrate to cause an extension of the substrate from the retracted configuration to the extended configuration.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3 is a cross-sectional view of the sun shield device shown in FIG. 1, taken along line 3-3;

FIG. 4 is a detail view of a portion of the sun shield device shown in FIG. 1;

DETAILED DESCRIPTION OF THE PREFERRED EMBODIMENTS

Figure 1:
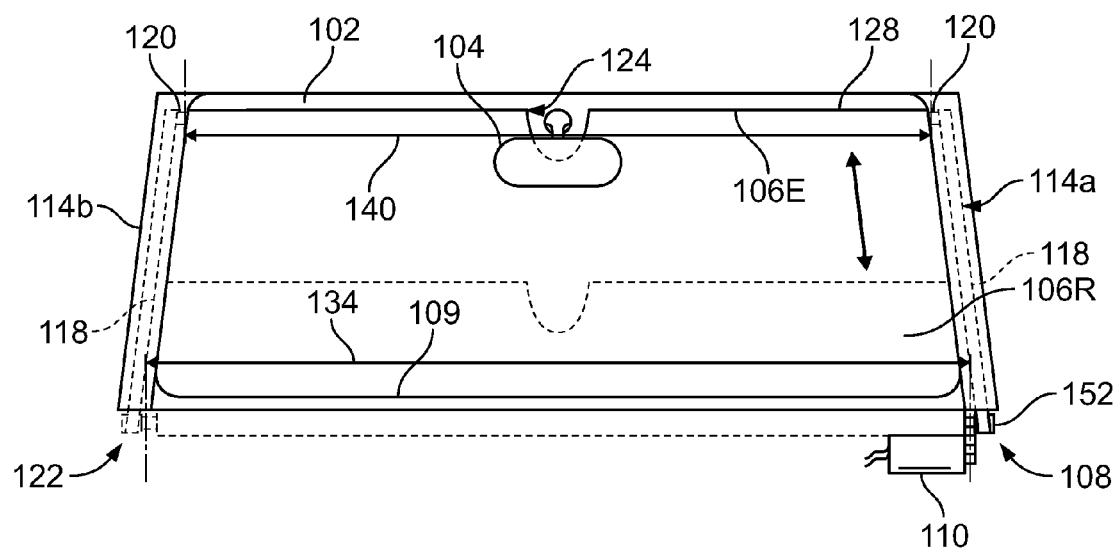
FIG. 1 is a front elevational view of a sun shield device for a windshield.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 122 generally designates a sun screen for use in an automobile 130 (shown in FIG. 5, for example) having a windshield 102, and A-pillar 114, and a dashboard 109. Sun screen assembly 122 includes a spool 112 rotatably coupled with the dashboard 109, and a guide 120 moveably coupled with the A-pillar 114. The sun screen 122 further includes a unitary, flexible substrate 106 spanning a width of the windshield 102 and having a trailing end 126 coupled with the spool 112 and leading end 128 coupled with the guide 120 such that substrate 106 is selectively extendable over the windshield 102 and retractable on the spool 112.

An example of a sun screen assembly 122 used in connection with a windshield 102 and a dashboard 109 as shown in FIGS. 1-4. As further shown in the embodiment of FIGS. 5-17, the sun screen assembly 122 is adapted for use in an automobile 130 wherein windshield 102 is positioned on the forward-facing end of a passenger cabin of automobile 130. Further embodiments of sun screen assembly 122 can be adapted for us in other vehicles having windshields enclosing at least a portion of a passenger or operator cabin. As shown in FIG. 1, windshield 102 includes a rearview mirror 104 that projects from an upper portion of the windshield 102 in a direction toward a driver (not shown) of automobile 130. Flexible substrate 106 is included in assembly 122 and is available for movement in an upward or downward direction to selectively cover windshield 102 to block sunlight (in the extended position 106E in FIG. 1), or to retract into dashboard 109 (in a retracted position 106R in FIG. 1). A cut out 124 is disposed along free end 128 of substrate 106, and allows substrate 106 to be pulled up past rearview mirror 104 on either side thereof. A drive assembly 108 is included in sun screen assembly 122, and is used to raise and lower substrate 106 over windshield 102.

Figure 2:
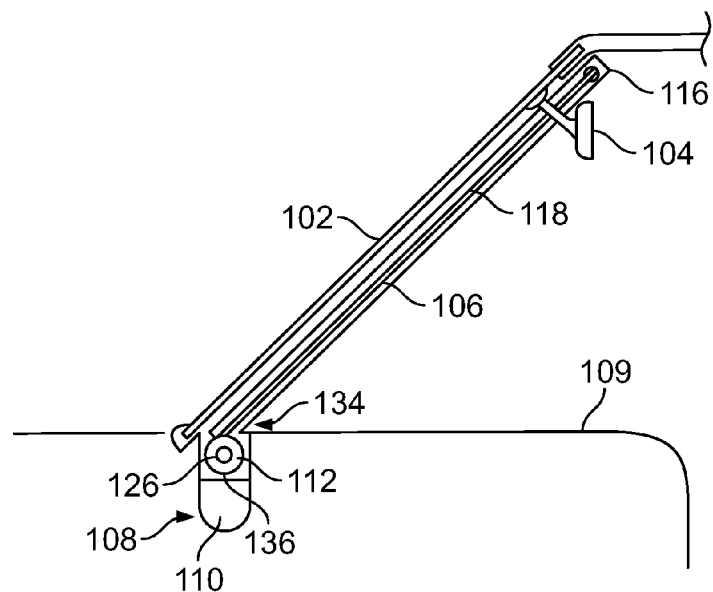
FIG. 2 is a cross-sectional view of the sun shield device shown in FIG. 1, taken along line 2-2.

As shown in FIG. 2, spool 112, which is in the shape of an elongated cylinder, is rotatably coupled at a location within the interior of dashboard 109. Such an arrangement allows for the majority of substrate 106, when in a retracted position with respect to spool 112, to be positioned within dashboard 109 and out of view from occupants of automobile 130. Trailing end 126 of substrate 106 is secured to spool 112 so that the substrate 106 can be rolled up on spool 112, such as in a retracted position. An upwardly-directed force applied on leading end 128 of substrate 106, in a direction away from dashboard 109, may cause spool 112 to rotate, allowing substrate 106 to unroll therefrom and to extend toward the extended position thereof.

As mentioned previously, automobile 130 includes a pair of pillars 114a and 114b, in the form of automobile A-pillars, disposed on respective opposite sides of windshield 102. Pillars 114a and 114b provide structural support for automobile 130 and further provide support and anchoring for windshield 102. In addition, side pillars 114a, 114b shown in FIGS. 3 and 4 are used to conceal at least portions of the belt drive assembly 108 that is used to move substrate 106 between the retracted 106R and extended 106E positions. In the examples shown in the Figures, upper roller 116 is used to support belt 118 in conjunction with lower roller 152, such that belt 118 can travel at least partially within the associated side pillar 114. An electric motor 110 included in the drive assembly 108 is positioned and arranged such that the electric motor 110 can cause spool 112 to rotate in either direction (e.g. clockwise or counterclockwise) to roll or unroll substrate 106 from spool 112. Connector 120 is secured to an edge of substrate 106 and is attached to belt 118. Accordingly, movement of electric motor 110 can control either extending movement or retracting movement of substrate 106. For example, as motor 110 rotates in a first direction, such as a clockwise direction according to the depiction thereof in FIG. 4, belt 118 will move such that connector 120 moves in a generally vertical direction with respect to windshield 102, causing substrate 106 to unroll from spool 112 and move up to cover windshield 102. Similarly, as motor 110 moves in an opposite direction, such as counterclockwise with respect to the depiction thereof in FIG. 4, belt 118 moves in a direction such that connector 120 moves in a generally vertically downward direction, causing substrate 106 to move down and roll back onto spool 112.

In an example spool 112 may be spring biased in its coupling with dashboard 109 such that spool 112 tends to urge substrate 106 into the retracted position, thereby helping maintain tension within substrate 106 when it is in the extended position, and to help roll substrate 106 onto spool 112 during retraction of substrate 106. As shown in FIG. 1, assembly 122 can include a pair of substantially identical (but mirror-imaged) belt drive assemblies, as described above, in each of the A-pillars 114a and 114b. Both belt drive assemblies 108 can cooperatively operate in the same manner to move the substrate 106 over windshield 102 and/or to retract substrate 106 onto spool 112. In various embodiments, only one or both of the belt drive assemblies 108 can include a motor 110.

As shown in FIG. 1, spool 112 can be sized to extend and span substantially the entire width 132 of windshield 102. In the examples shown, spool 112 spans width 132 of windshield 102 as a substantially unitary structure, i.e. such that a single spool 112 itself spans the entire width 132. In such a structure, a single, unitary substrate 106 is configured to extend from spool 112 to substantially cover the entire interior surface of windshield 102 (although some gaps may be present along the edges thereof). As such, the entirety of trailing end 126 extends along and is coupled with spool 112. As shown in FIG. 3, spool 112 can be coupled with an interior of dashboard 109 such that substrate 106 can extend outwardly from dashboard 109 through a slot 134 defined through dashboard 109. Slot 134 can further generally extend along dashboard 109 through substantially the entire width 132 of windshield 102 to accommodate the extension of substrate 106 therethrough. In the example shown, in FIG. 3, a spool housing 136 can be mounted within the interior of dashboard 109 within which spool 112 can be rotatably coupled, thereby coupling spool 112 within dashboard 109. The incorporation of housing 136 into such a structure can help isolate sun screen assembly 122 from additional structures or systems located along the interior of dashboard 109.

To facilitate the extension of spool 112 and substrate 106 along width 132 of windshield 102, side pillars 114 can be configured such that belt drive assembly 108 is at least partially recessed therein. For example, as shown in FIG. 4, upper roller 116 and belt 118 can be received within an interior of pillar 114a and connector 120 can attach with belt 118 in an interior location with respect to pillar 114a and can further extend outwardly to the attachment with leading end 128 of substrate 106. An elongate slot in the form of a track (similar to track 238 in FIG. 6) can be formed through a portion of pillar 114a such that connector 120 can engage therewith by extending therethrough throughout the range of motion for substrate 106, such that connector 120 is slidably disposed along such a track (see track 238 in FIG. 6).

Turning now to the embodiment shown in FIGS. 5-17, sun screen assembly 222 (FIG. 11) can be generally similar to the embodiment of FIGS. 1-4, and can include a flexible substrate 206 with a notch in the form of cutout 224 to allow leading end 228 to extend above rearview mirror 204. Belt drive assemblies 208, each including a belt 218 supported by a top roller 216 and lower roller 252 and driven by one or more respective motors 210 are included within the A-pillars 214a and 214b of the associated automobile 230. Substrate 206 is connected at its leading end 228 with belt 218 by respective associated connectors 220 such that movement of the belt causes selective extension and retraction of substrate 206 on spool 212, which is rotatably mounted within housing 236 that is coupled within dashboard 209 such that spool 212 is concealed and substrate 206 passes through slot 234. Both spool 212 and substrate 206 are generally configured to span an entire width 232 of the lower end of windshield 202 adjacent dashboard 209.

Figure 5:
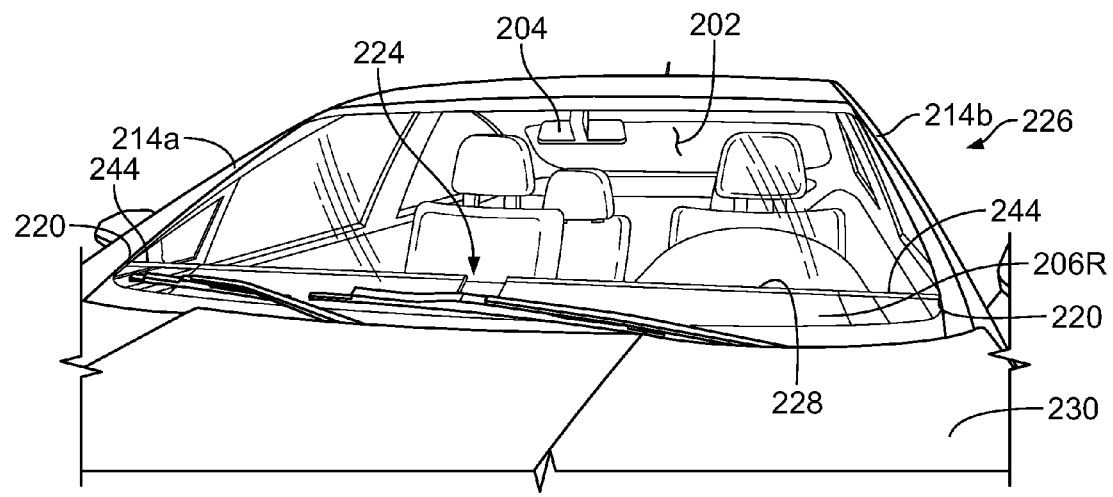
FIG. 5 is an exterior view of a portion of a vehicle including a sun shield device according to a second embodiment in a retracted position.
Figure 6:
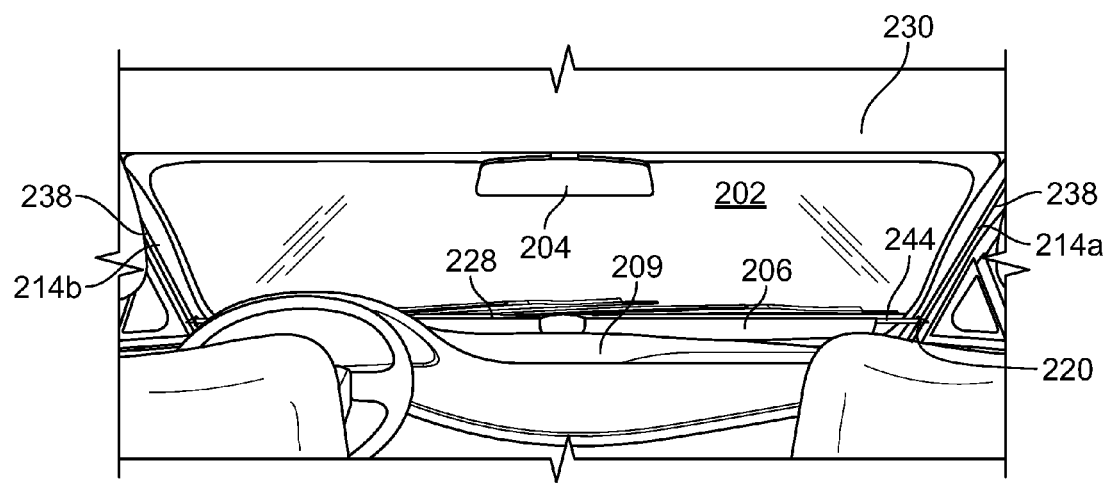
FIG. 6 is an interior view of the vehicle and associated sun shield device of FIG. 5.
Figure 7:
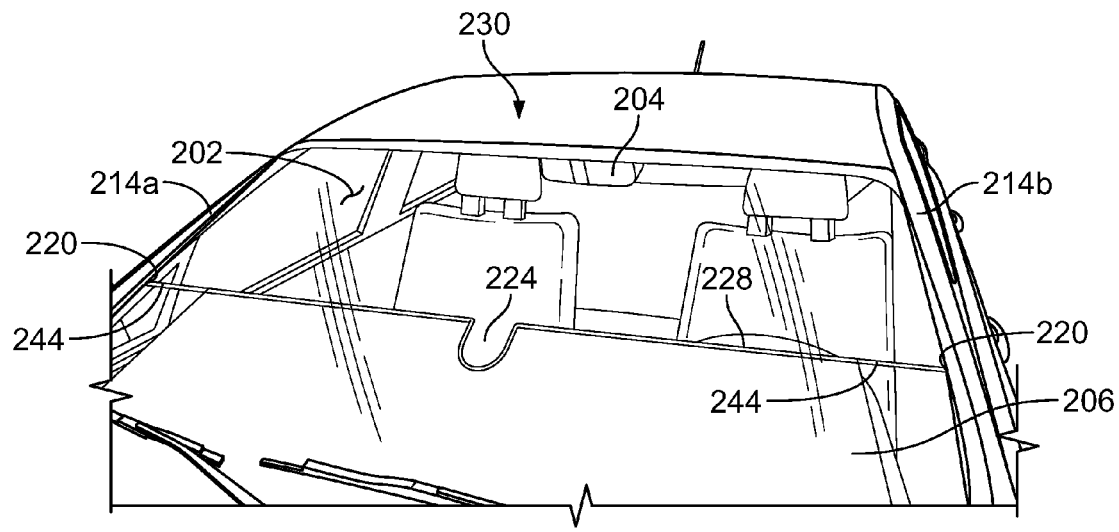
FIG. 7 is an exterior view of the vehicle and associated sun shield device of FIG. 5 with the sun shield in an intermediate position.
Figure 8:
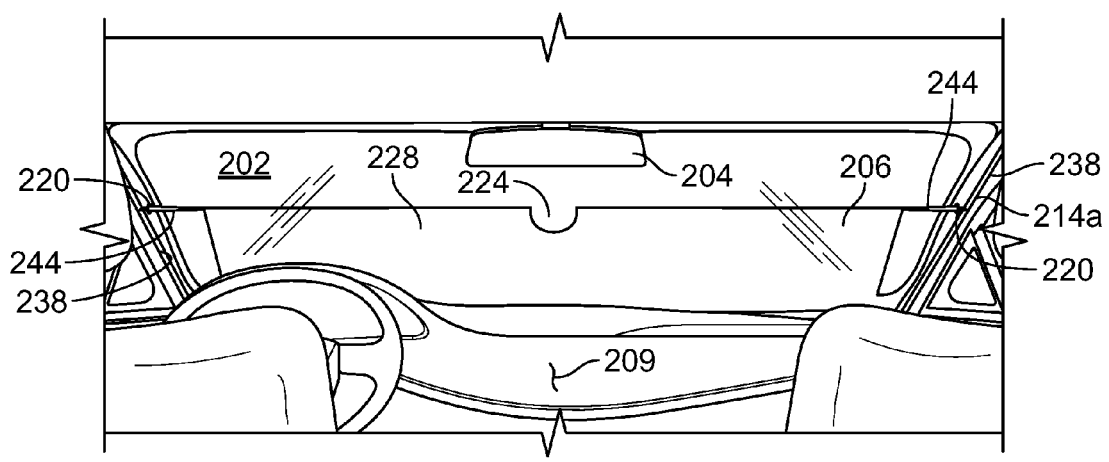
FIG. 8 is an interior view of the vehicle and associated sun shield device of FIG. 7.
Figure 9:
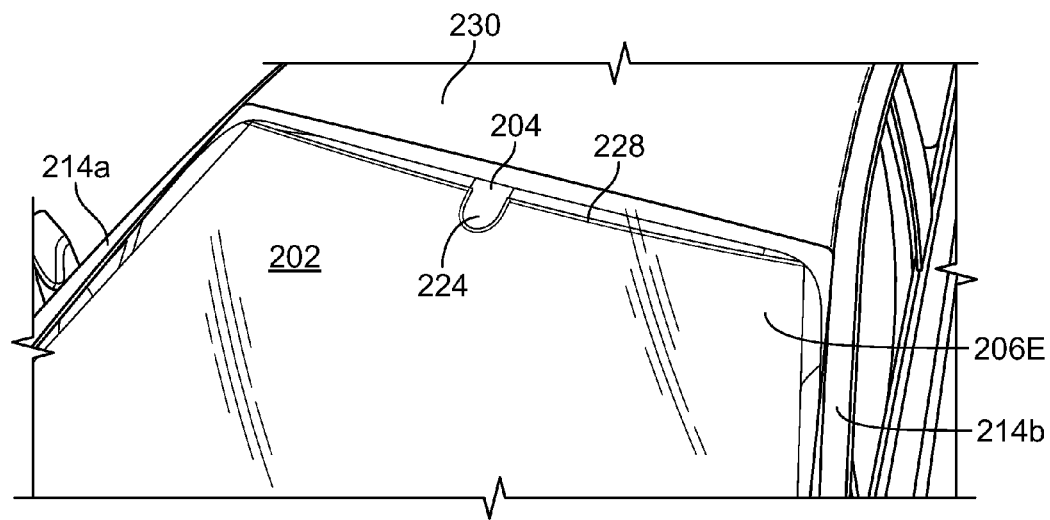
FIG. 9 is an exterior view of the vehicle and associated sun shield device of FIG. 5 with the sun shield in an extended position.
Figure 10:
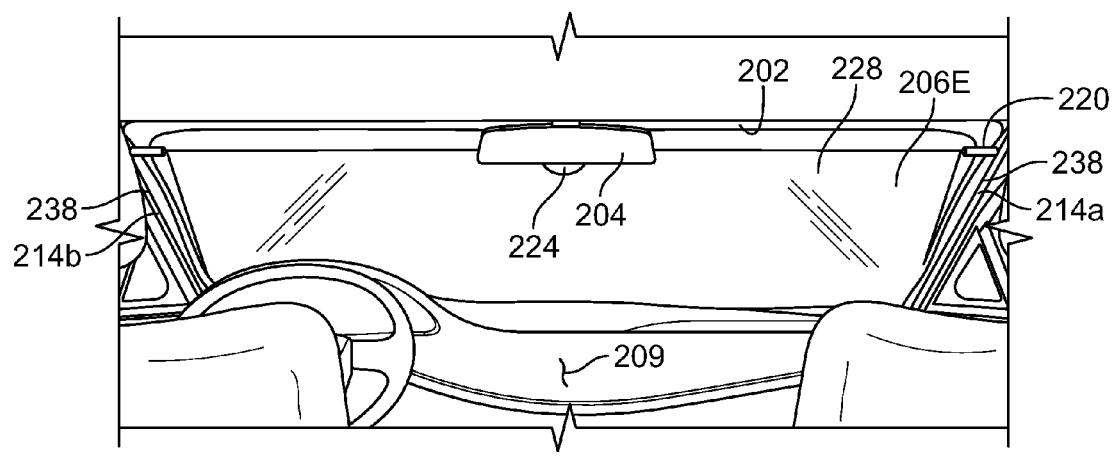
FIG. 10 is an interior view of the vehicle and associated sun shield device of FIG. 9.
Figure 11:
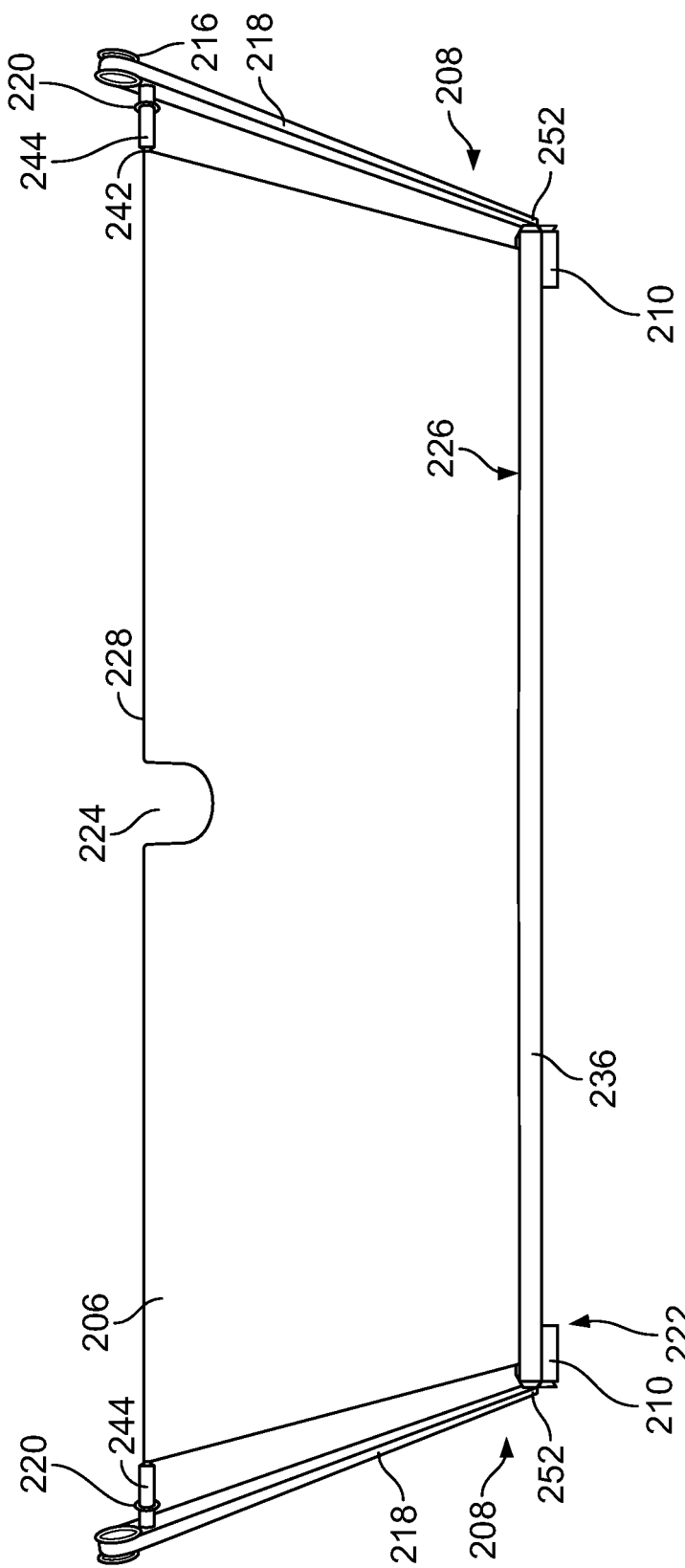
FIG. 11 is an elevational view of the sun shield assembly of FIG. 5, including internal components thereof.
Figure 12:
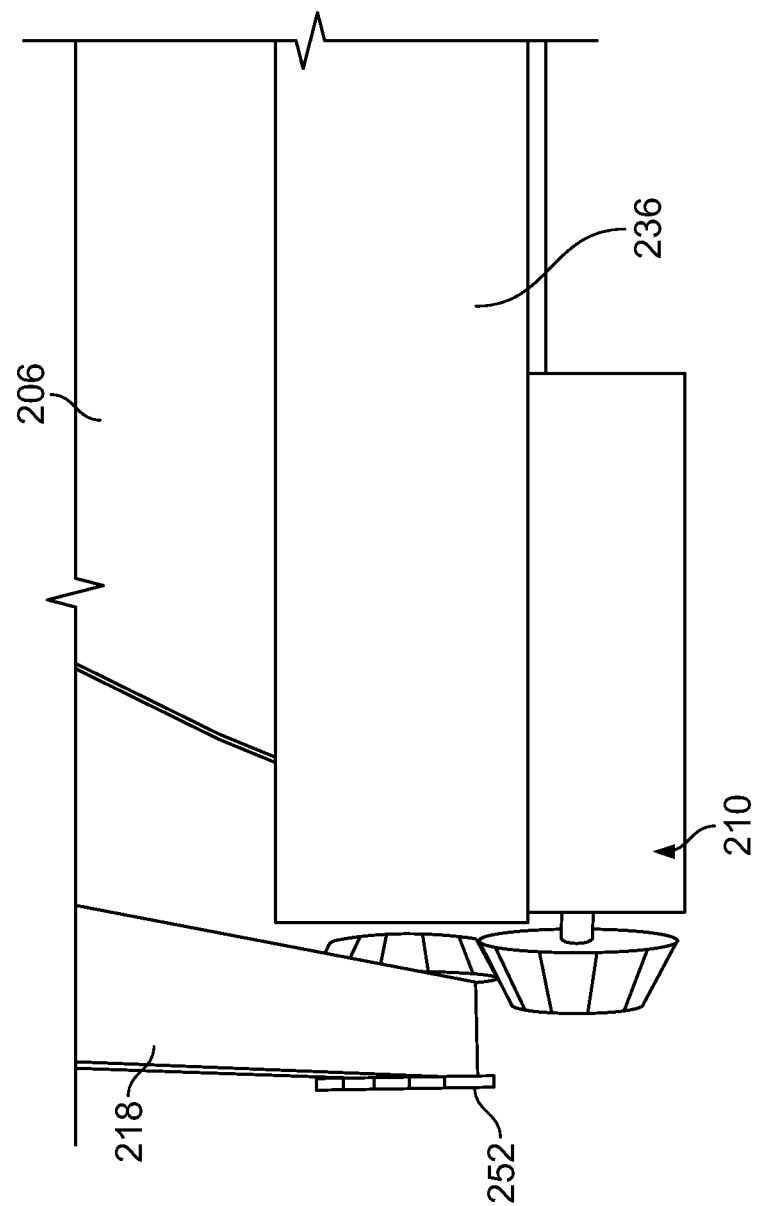
FIG. 12 is a detail view of the sun shield assembly of FIG. 11.
Figure 13:
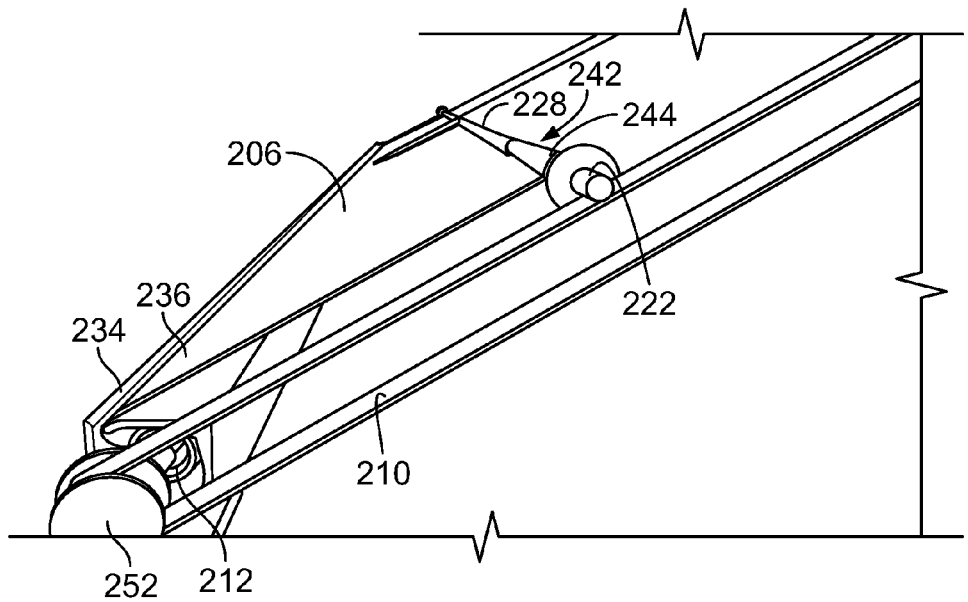
FIG. 13 is a detail view of the sun shield assembly of FIG. 11 showing components thereof when the device is in the retracted position.
Figure 14:
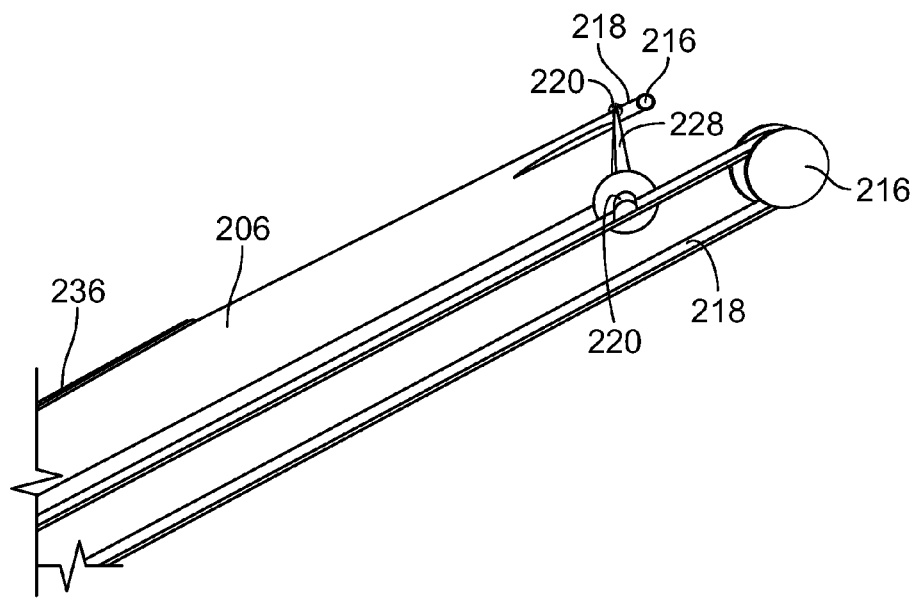
FIG. 14 is a detail view of the sun shield assembly of FIG. 11 showing components thereof when the device is in the extended position.

As shown in FIGS. 5 through 10, windshield 202 may be tapered such that width 232 at the bottom thereof is greater than the width 240 along the top thereof. Further, the associated side pillars 214a and 214b may be angled inwardly following the tapered arrangement of windshield 202. Accordingly, the distance between track 238 associated with pillar 214a and track 238 associated with pillar 214b may decrease with corresponding increasing distance from dashboard 209. To be able to substantially fully extend over the windshield 202 when in the fully extended position 206E, substrate 206 may be shaped to have a similar tapered arrangement, wherein leading end 228 is shorter than trailing end 226. Accordingly, as shown in FIGS. 5 and 6, the outer edges of the leading end 228 may be disposed remote from the associated tracks 238 when substrate 206 is at or near the retracted position 206R. To provide support for substrate 206 and to be able to apply an appropriate force so as to extend substrate 206 when desired, a support member in the form of, for example, support rod 242 may be coupled with leading end 228 of substrate 206. Support 242 can further extend between connectors 220 and couple therewith such that movement of connectors 220 causes movement of support 242 and corresponding extension or retraction of substrate 206. Support 242 can be in the form of a rigid rod or beam that can be made from a metal or plastic material.

Figure 15:
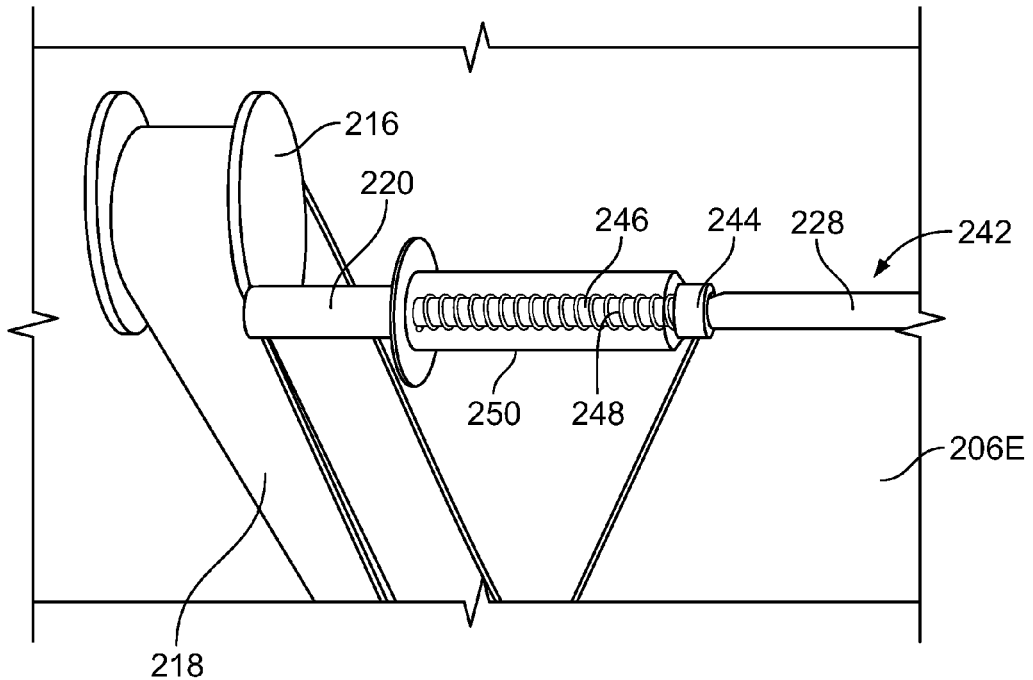
FIG. 15 is a further detail view of the sun shield assembly of FIG. 11 showing additional components thereof when the device is in the extended position.
Figure 16:
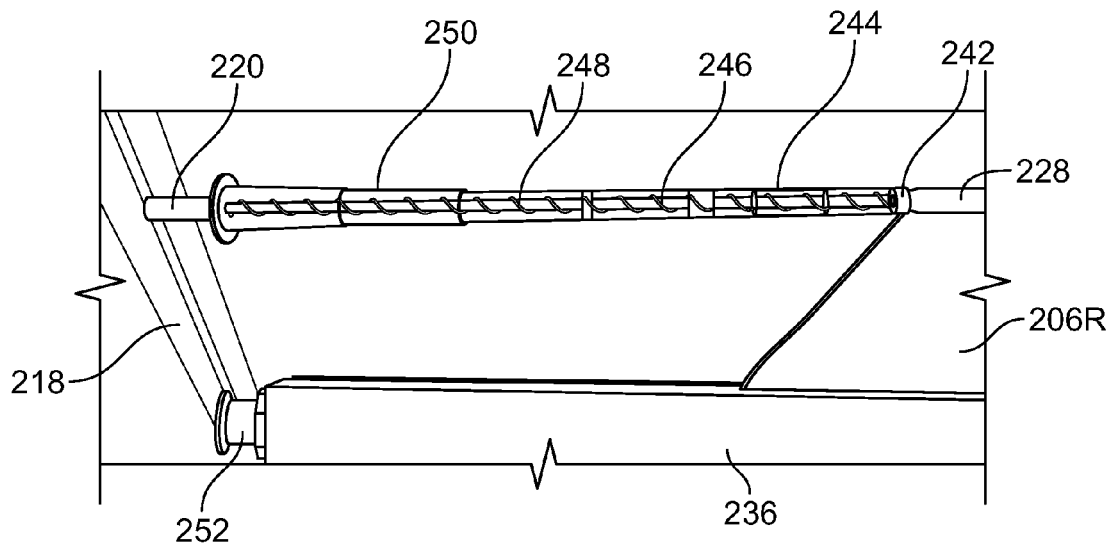
FIG. 16 is a detail view of the sun shield assembly of FIG. 11 showing components thereof when the device is in the retracted position.
Figure 17:
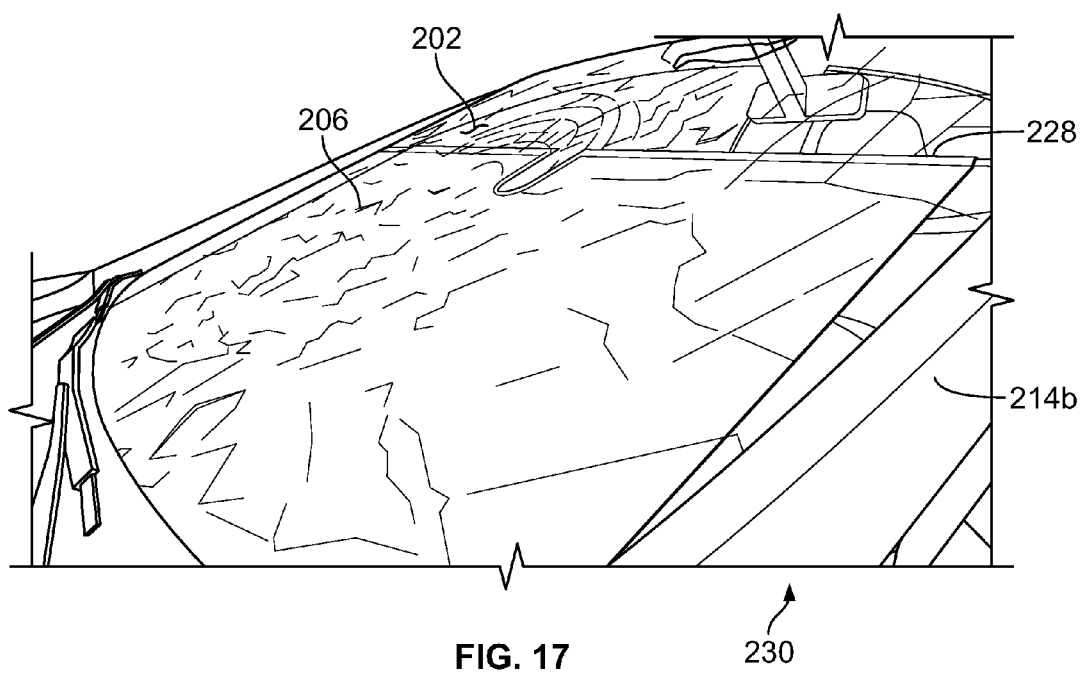
FIG. 17 is an elevational view of a vehicle including a sun shield device as a component of a vehicle safety system.

To provide for continuous coupling between leading end 228 and connectors 220, support 242 can be coupled with connectors 220 by extendable pistons 244, as shown in FIGS. 15 and 16. Piston 244 can include a cylinder 246 received within a portion of support 242 so as to be extendable inwardly and outwardly therefrom. Further, a spring 248 may be coupled between connector 220 and support 242 to bias piston 244 towards the retracted position shown in FIG. 15. A telescoping housing 250 can surround and generally obscure spring 248 from view throughout the range of motion between the retracted position shown in FIG. 15 and the extended position shown in FIG. 16. As shown in FIG. 16, when substrate 206 is at or near the retracted position 206R, piston 144 can extend outwardly from support 142 to span the difference in width between leading end 228 and track 238. As substrate 206 is extended, the distance between the edge of leading end 228 and the associated connector 220 decreases, and piston 244 collapses to accommodate the decreasing distance.

As previously described, the sun screen assembly 222 can be provided to allow for selective blocking of windshield 202 by at least partially opaque substrate 206. Automobile 230 can be configured to provide a user-selectable control (not shown) to allow an occupant of automobile to selectively raise or lower substrate 206, as desired. Automobile 230 can include various interlocks or overrides to ensure that the automobile occupant is only allowed to extend substrate 206 when it is safe to do so, such as while automobile 230 is in park, when the ignition is turned off, or the like. Additionally or alternatively, automobile 230 can be programmed to automatically extend or retract substrate 206 when doing so would be both safe and advantageous. For example automobile 230 can be programmed to automatically extend substrate 206 when automobile 230 is in "park" or has been placed in park for a predetermined amount of time. Further, automobile 230 can be programmed to determine that excessive sunlight is causing the temperature within automobile 230 to rise, or that a threshold amount of sunlight is present, at which point substrate 206 can be extended. Similarly, automobile 230 can be programmed to automatically retract substrate 206, for example when a user unlocks the doors of automobile 230 using a remote, upon key-in or ignition of automobile 230, or when automobile 230 is shifted from park. Such automatic retraction of substrate 206 can be done following either manual or automatic extension of substrate 206.

Automobile 230 can further be configured to extend substrate 206 upon detection of a crash situation or upon actual breakage of the glass comprising windshield 202. Such control functionality can be achieved by communicatively coupling the controls for sun screen assembly 222 with a crash detection system within automobile 230, or with a glass break sensor coupled with windshield 202. Accordingly, automobile 230 can be programmed to rapidly deploy substrate 206 when a crash or breakage of windshield 202 is detected. Such rapid extension of substrate 206 can be achieved by activating a high-power mode of motors 210, or by activating one or more propellant units (not shown) coupled with belt drive assembly 208. Such propellant units can include pre-filled chambers of compressed gas, or canisters with chemicals that can be mutually exposed, when needed, to generate a rapid gas-producing chemical reaction. In an example such a propellant unit can be configured to provide for rotational motion, and can be attached with the lower roller 252, such as by an additional gear or clutch mechanism. Either mechanism for rapidly deploying substrate 206 can be configured in an embodiment such that, when needed substrate 206 can be moved from the fully retracted position (206R shown in FIG. 5) to the fully extended position (206E shown in FIG. 9) in between about 0.1 seconds and about 0.5 seconds. In an embodiment, such a rapid deployment mechanism can cause substrate 206 to be moved from the fully retracted position (206R shown in FIG. 5) to the fully extended position (206E shown in FIG. 9) in about 0.3 seconds or less, or about 0.2 seconds, or in another embodiment about 0.1 seconds. According to such examples, a sun shield with the above-described rapid deployment can also be incorporated into a safety system associated with automobile 130, above.

Figure 18:
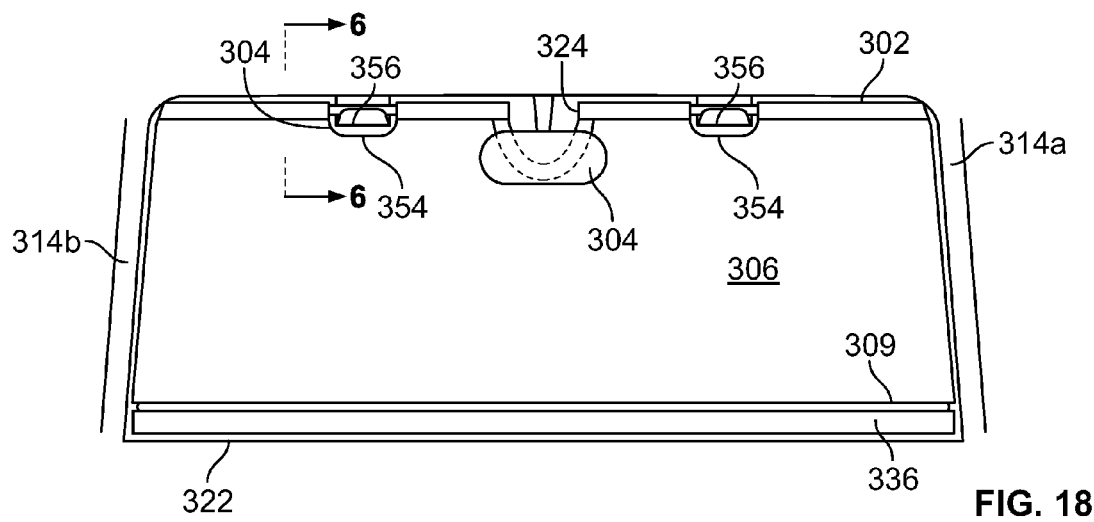
FIG. 18 is a front view of a further embodiment of a sun shield device for a windshield.
Figure 19:
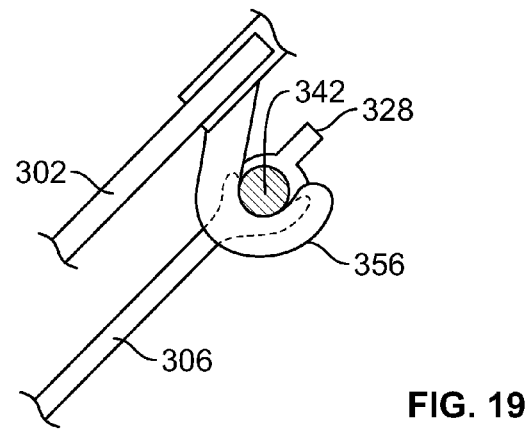
FIG. 19 is a cross-sectional view of an upper portion of the sun shield device shown in FIG. 5 taken along line 6-6.

Referring now to FIGS. 18 and 19, an additional embodiment of sun screen assembly 322 is shown, which is configured for non-powered manual operation. In general, the structure of assembly 322 is similar to those which are described above with respect to FIGS. 1-4 and 5-16, however assembly 322 does not include any electric motors, and may not include belts (such as belts 118) or associated supporting rollers (such as rollers 116 or 152). Housing 336 is mounted within dashboard 309, in a manner similar to that which is described above with respect to FIGS. 1-4. In an optional variation, tracks (not shown) can be provided within which corresponding connectors can be slidably coupled for movement along the associated A-pillars 314a and 314b. In the example shown, a manually operable variation of assembly 322 can be provided without connectors or tracks, such that leading end 328 is freely extendable from out of slot 334 and dashboard 309.

A pair of hooks 354 are provided in spaced apart locations along leading end 328 of substrate 306 such that an operator can pull upwardly on leading end 328, such as by apertures 356, which are spaced apart at various locations along leading end 328 so as to act as handles, such that substrate 306 fully extends over windshield 302. When substrate 306 is fully extended, it can be retained in place by assembling apertures 356 onto corresponding hooks 354, which extend, for example, from headliner 358 in the area of the upper edge of the windshield 302. In such an embodiment, substrate 306 may be of an opaque material, such that a user cannot see his or her surroundings with substrate 306 in the extended position 306E, thereby discouraging improper use of substrate 306 to obscure the windshield 302 during driving.

Figure 20:
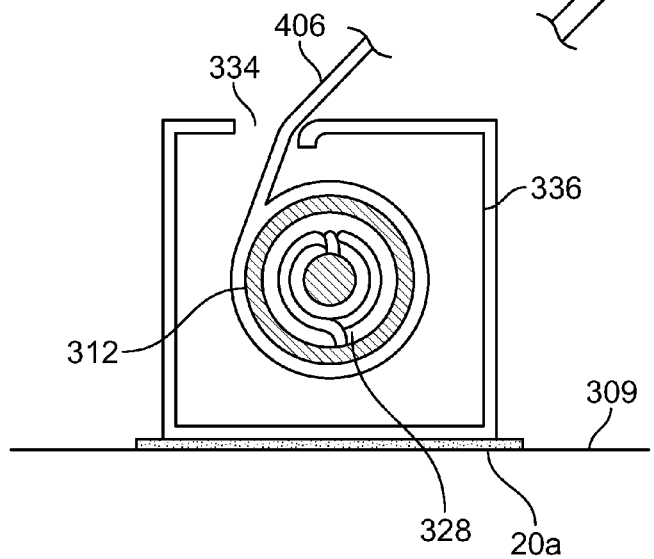
FIG. 20 is a cross-sectional view of a portion of a further embodiment of a sun shield device for use in connection with a windshield.

As shown in FIG. 20, a further variation of a non-powered manually operable sun screen assembly 422 is shown. In particular, assembly 422 includes a housing 436 that is configured to be attached to an outside, or upper, surface of dashboard 409. Accordingly, assembly 422 can be provided as an after-market add-on for an automobile such that a retractable substrate 406 can be provided therefor to cover windshield 402. In such an embodiment, housing 436 can be configured to couple with exterior of dashboard 409 by adhesives, or mating adhesive-backed clips or hook-and-loop type fasteners, or by other mechanical attachment. Once assembled, substrate 406 can be extended from housing 436 in a manner of similar to the variation described above with respect to FIGS. 18 and 19. Further, in such a variation leading end 428 would be disconnected with automobile pillars 414 associated with windshield 402, in a manner similar to one variation of the non-powered variation of FIGS. 18 and 19. One or more hooks (not shown) similar to hooks 354 can be provided, for example, in a kit with assembly 422, which can be assembled with an associated headliner using appropriate attachment structures. In such an example apertures similar to apertures 356 shown in FIG. 18, can be secured onto such hooks to maintain substrate 406 in an extended position achieved by the operator pulling upwardly on the leading end 428 of substrate 406.

It is noted that any of the above embodiments can be adapted to be used as sun screens in connection with any other window of an automobile or other windowed vehicle. In various examples, the sun screen assembly can be adapted to be used in connection with a side window by coupling belt drive mechanisms with any appropriate, adjacent portion or member of the vehicle body, including between adjacent vehicle pillars (e.g. A- and B-pillars or B- and C-Pillars) or portions of the associated door frame. The spool can be coupled within an associated door panel having a slot therein through which the flexible substrate can extend. In another example, the sun screen assembly can be adapted to be used in connection with a rear window by coupling belt drive mechanisms with adjacent C-pillars or of the automobile and coupling the spool to an interior side of the rear deck.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

I claim:

1. A sun screen for a vehicle having a windshield with a rearview mirror adjacent an upper edge thereof, an A-pillar and a dashboard, comprising:
    a spool rotatably coupled within an interior of the dashboard;
    a guide moveably coupled with the A-pillar;
    a track coupled with the A-pillar, the guide being coupled with the A-pillar by slidable engagement with the track; and
    a unitary, flexible substrate spanning a width of the windshield and having a trailing end coupled with the spool and a leading end coupled with the guide such that the substrate is selectively extendable through a slot in the dashboard and over the windshield and retractable on the spool, wherein the leading end of the substrate defines a notch to surround a portion of the rearview mirror.

2. The sun screen of claim 1, wherein:
the spool spans substantially the entire width of the windshield in a unitary structure; and
the entire trailing end is coupled with the spool.

3. The sun screen of claim 1, further including:
a belt within the track and coupled with the guide for driving movement of the guide along the track; and
a motor coupled with the belt for driving movement of the belt.

4. The sun screen of claim 3, further including a controller in communication with the motor and permitting the motor to drive movement of the belt only when the vehicle is in a park mode.

5. The sun screen of claim 3, further including a controller in communication with the motor and automatically causing the motor to drive movement of the belt so as to extend the flexible substrate over the windshield when the vehicle is placed in a park mode.

6. The sun screen of claim 1, wherein the A-pillar is a first A-pillar, and the guide is a first guide, the sun screen further including:
a second guide movably coupled with a second A-pillar positioned opposite the first A-pillar with respect to the windshield; and
a support member extending between the first guide and the second guide, the leading end of the substrate being coupled with the first guide and the second guide by being coupled with the support member.

7. The sun screen of claim 6, wherein the first and second guides are moveably coupled on the support member by respective pistons coupled between the guide and respective ones of a first end and a second end of the support member adjacent thereto, the piston being extendable from and retractable into a portion of the support member and being coupled with the guide, the sun screen further comprising:
a spring surrounding a portion of the piston and coupled between a portion of the piston and the first end of the support member to urge the piston into a retracted position with respect to the first end of the support member; and
a cover enclosing the spring and a portion of the piston.

8. The sun screen of claim 1, further including a drive mechanism having a propellant unit operatively coupled with the guide to cause an extension of the substrate from a retracted configuration, wherein the substrate is rolled onto the spool, to an extended configuration, wherein the substrate substantially covers an interior of the windshield, wherein the extension takes place in less than about 0.5 seconds.

9. The sun screen of claim 8, wherein the drive mechanism is coupled with a crash detection system of the vehicle such that the crash detection system can cause the extension of the substrate by the propellant unit.

10. The sun screen of claim 1, further including:
a hook coupled with a headliner of the vehicle adjacent an upper edge of the windshield; and
a handle coupled with the leading end of the substrate and coupleable with the hook to retain the sun screen in an extended position over the windshield;
wherein the substrate is of an opaque material.

11. An automobile, comprising:
a window;
a body member bounding a lateral edge of the window;
a panel extending from the body member adjacent a lower edge of the window; and
a sun screen, including:
a spool rotatably coupled with the panel;
a guide moveably coupled with the body member; and
a flexible substrate having a trailing end coupled with the spool and a leading end coupled with the guide such that the substrate is selectively extendable over the window and retractable on the spool;
a support member coupled with the leading end of the substrate; and
a piston coupled between the guide and a first end of the support member adjacent thereto, the piston being extendable from and retractable into a portion of the support member and being coupled with the guide;
a spring surrounding a portion of the piston and coupled between a portion of the piston and the first end of the support member to urge the piston into a retracted position with respect to the first end of the support member; and
a cover enclosing the spring and a portion of the piston.

12. The automobile of claim 11, wherein the substrate spans a width of the window, the entire trailing end thereof being coupled with the spool.

13. The automobile of claim 11, further including:
a track coupled with the body member, the guide being coupled with the body member by slidable engagement with the track;
a belt within the track and coupled with the guide for driving movement of the guide along the track; and
a motor coupled with the belt for driving movement of the belt.

14. The automobile of claim 11, wherein:
the spool is coupled within an interior of the panel; and
the panel defines a slot through which the substrate passes to be extendable over the window.

15. A vehicle safety system for a vehicle having a windshield and a dashboard, comprising:
a screen including a flexible substrate spanning a width of the windshield and being selectively positionable in an extended position over the windshield and a retracted position within the dashboard;
a drive mechanism having a propellant unit operatively coupled with the substrate to cause an extension of the substrate from the retracted position to the extended position; and
a crash detection system within the vehicle and coupled with the drive mechanism, wherein the crash detection system is operable to cause the extension of the substrate by the propellant unit.

16. The safety system of claim 15, wherein the extension takes place in less than about 0.5 seconds.

17. The safety system of claim 15, wherein:
the screen further includes a spool rotatably coupled within an interior of the dashboard, and a guide moveably coupled with an A-pillar of the vehicle extending upwardly from the dashboard adjacent a lateral edge of the windshield; and
the flexible substrate has a trailing end coupled with the spool and a leading end coupled with the guide, the propellant unit of the drive mechanism being operatively coupled with the substrate by operative engagement with the guide.

* * * * *